United States Patent
Fähland et al.

(10) Patent No.: US 7,367,919 B2
(45) Date of Patent: May 6, 2008

(54) TRANSMISSION CONFIGURATION AND METHOD FOR CONTROLLING A TRANSMISSION

(75) Inventors: Jörg Fähland, Sassenburg (DE); Bernd Cappelmann, Wendeburg (DE); Rainer Hofmann, Helmstedt (DE); Ansgar Damm, Gifhorn (DE); Günter Rühle, Löchgau (DE); Martin Seufert, Steinheim (DE); Matthias Beck, Heilbronn (DE); Josef Glatthaar, Oberndorf (DE); Lothar Herdle, Stuttgart (DE)

(73) Assignees: Volkswagen Aktiengesellschaft, Wolfsburg (DE); GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/728,433

(22) Filed: Mar. 26, 2007

(65) Prior Publication Data
US 2007/0214906 A1 Sep. 20, 2007

Related U.S. Application Data

(63) Continuation of application No. PCT/EP2005/010031, filed on Sep. 16, 2005.

(30) Foreign Application Priority Data
Sep. 24, 2004 (DE) ............... 10 2004 046 558

(51) Int. Cl.
*B60W 10/02* (2006.01)
*F16H 3/08* (2006.01)

(52) U.S. Cl. .................................... 477/79; 74/331

(58) Field of Classification Search ......... 74/329, 74/330, 331, 340, 335; 477/79, 80
See application file for complete search history.

(56) References Cited

U.S. PATENT DOCUMENTS

| 4,771,648 | A | 9/1988 | Bardoll |
| 6,490,944 | B1 | 12/2002 | Heinzel et al. |
| 2004/0112171 | A1 | 6/2004 | Kuhstrebe et al. |
| 2004/0166992 | A1* | 8/2004 | Buchanan et al. ......... 477/181 |
| 2006/0040777 | A1 | 2/2006 | Gartner et al. |

FOREIGN PATENT DOCUMENTS

| DE | 35 46 454 A1 | 2/1987 |
| DE | 36 20 884 A1 | 12/1987 |
| DE | 199 39 819 C1 | 11/2000 |
| DE | 199 39 818 C1 | 1/2001 |
| DE | 103 08 218 A1 | 9/2004 |
| EP | 1 382 479 A2 | 1/2004 |

* cited by examiner

*Primary Examiner*—Roger Pang
(74) *Attorney, Agent, or Firm*—Manfred Beck, P.A.

(57) ABSTRACT

A transmission configuration includes an automated dual-clutch transmission having two transmission sections with respective input shafts, respective output shafts and respective motor clutches. The motor clutches are connected, on a motor side thereof, to a drive shaft and to a respective one of the input shafts on a transmission side thereof. A drive-side speed sensor unit is disposed at the drive shaft. An input-side speed sensor configuration includes sensor wheels connected, fixed against relative rotation, to respective ones of the input shafts, and pulse sensors disposed stationary with respect to a housing and within an effective range of the respective sensor wheels. The input-side speed sensor configuration is configured to detect a speed of the input shafts and a direction of rotation of at least one of the input shafts. A method for controlling an automated dual-clutch transmission is also provided.

7 Claims, 2 Drawing Sheets

TRANSMISSION CONFIGURATION AND METHOD FOR CONTROLLING A TRANSMISSION

CROSS-REFERENCE TO RELATED APPLICATIONS

This application is a continuation, under 35 U.S.C. § 120, of copending International Application No. PCT/EP2005/010031, filed Sep. 16, 2005, which designated the United States; this application also claims the priority, under 35 U.S.C. § 119, of German Patent Application No. DE 10 2004 046 558.4, filed Sep. 24, 2004; the prior applications are herewith incorporated by reference in their entirety.

BACKGROUND OF THE INVENTION

Field of the Invention

The invention relates to a transmission configuration and a method for controlling a transmission. More specifically, the invention relates to a sensor configuration for an automated dual-clutch transmission with two transmission sections, each having a motor clutch connected on a motor side thereof, via a drive shaft, to a drive motor, an input shaft connected to the motor clutch on a transmission side thereof, and gear wheel sets forming a group of gear stages and each including a fixed gear and an idler gear, wherein a connection with a gear ratio between the input shaft and an output shaft can be established with the gear stages by in each case engaging a gear clutch assigned to the idler gear, wherein the output shaft forms a power take-off shaft connected to an axle drive or wherein the output shaft is permanently connected to such a power take-off shaft, and with a sensor configuration with at least a drive-side speed sensor unit disposed at the drive shaft, a first input-side speed sensor unit disposed at the input shaft of a first one of the transmission sections, and a second input-side speed sensor unit disposed at the input shaft of the second one of the transmission sections, wherein the input-side speed sensor units include a respective sensor wheel connected, fixed against relative rotation, to a respective one of the input shafts and a respective pulse sensor disposed stationary with respect to a housing and within an effective range of the respective sensor wheel. The invention furthermore relates to a method for controlling such an automated dual-clutch transmission.

The dual-clutch transmission has been known for quite a while as a transmission concept and is for example disclosed in German Patent Application Publication No. DE 35 46 454 A1, however, in practice it has been available in the form of an automated dual-clutch transmission only recently in some production passenger vehicles. The dual-clutch transmission includes a first transmission section with a first input shaft, wherein a first motor clutch and in most cases several gearwheel sets, which each form a gear stage, are assigned to the first input shaft and includes a second transmission section with a second input shaft, wherein a second motor clutch and several gearwheel sets, which form further gear stages, are assigned to the second input shaft. On the output side, the dual-clutch transmission can have a common output shaft, which is connected to the gearwheel sets of both transmissions sections or can be connected to them and, in this case, forms a power take-off shaft connected to the axle drive of a driven vehicle axle. In order to achieve an installation length that is as short as possible, which is in particular important in case of a transverse mounting of the drive unit, which is formed of the drive motor and the dual-clutch transmission, it is however also possible for the transmission sections of the dual-clutch transmission to have respective separate output shafts, which are disposed in a V-shape about the input shafts, which are usually disposed coaxial with respect to one another, wherein the output shafts are connected, via a power take-off gearing, with a common power take-off shaft. In case of such a dual-clutch transmission, the shift process between two gear stages, i.e. between an engaged load gear stage and a target gear stage to be engaged, which are assigned to different transmission sections, includes first engaging the target the gear stage, which usually is accomplished with a gear clutch, which is assigned to an idler gear of the corresponding gear stage and can be actuated via a shift collar, and subsequently, in a time-overlapping manner, separating the motor clutch assigned to the input shaft of the load the gear stage and closing the motor clutch assigned to the input shaft of the target gear stage. As a result, the power transmission is accomplished in a respective alternating manner via the first and the second input shaft and is not interrupted during the shift process, which is why the dual-clutch transmission falls in the category of power shift transmissions. In order to perform as many shift processes as possible in the described manner, the gear stages are assigned in an alternating manner to the two transmission sections, i.e. one transmission section includes the odd forward gear stages and the other transmission section includes the even forward gear stages.

Since the actuation of the two motor clutches, in particular the time-overlapping actuation, in such a shift process is extremely complex and cannot be accomplished with an acceptable mechanical outlay in a manual-mechanical manner, the conventional dual-clutch transmissions are embodied as automated transmissions and have several controllable actuators for actuating the motor clutches and the gear clutches as well as several speed sensor units for ascertaining required speed information and information related to a direction of rotation. As is for example disclosed in German Patent Number Nos. DE 199 39 818 C1 and DE 199 39 819 C1, conventional dual-clutch transmissions have at least one drive-side speed sensor unit disposed at the drive shaft, a first input-side speed sensor unit disposed at the first input shaft of the first transmission section and a second input-side speed sensor unit disposed at the second input shaft of the second transmission section, and a speed sensor unit on the power take-off side, which is in most cases embodied speed sensitive and sensitive to a direction of rotation and is disposed at a power take-off shaft, which is connected to an axle drive or at an output shaft which is permanently connected to the power take-off shaft. The drive-side speed sensor unit and the two input-side speed sensor units provide the speed on the motor side and, respectively, on the transmission side of the two motor clutches and are therefore mainly used for controlling the two motor clutches. The speed sensor unit on the power take-off side provides the speed and the direction of rotation of the power take-off shaft connected to the axle drive and is in particular used during driving-off processes for ascertaining the state of motion of the concerned motor vehicle, i.e. detecting a forward movement, a stopping of the vehicle, a backwards movement and the value of the movement speed. The speed sensor unit on the power take-off side is furthermore also used for diagnostic purposes such as a checking a plausibility of the effective gear ratio and monitoring the speed of the drive shaft.

A disadvantage of this sensor configuration is however the large number of speed sensor units that is used and in particular the spatial distance between the speed sensor unit on the power take-off side and the other speed sensor units. The high number of speed sensor units results in relatively high costs for purchasing, mounting and wiring as well as corresponding fault possibilities during operation. Due to the spatial distance of the speed sensor unit on the power take-off side, it is practically impossible to combine all speed sensor units in a module that can be pre-assembled so that they can be installed together. The placement of the speed sensor unit on the power take-off side at the power take-off shaft or an output shaft connected to the power take-off shaft is unfavorable with respect to the signaling system because these shafts have a relatively small speed which results in a reduced temporal resolution of the associated sensor signals and thus results in a delayed detection of a movement of the motor vehicle. As is disclosed in German Patent Application Publication No. DE 103 08 218 A1, this deficiency can be remedied by an additional evaluation of the sensor signal of a simple drive-side speed sensor unit disposed at a faster rotating gear shaft. However, this requires an increased outlay with respect to system and process engineering.

SUMMARY OF THE INVENTION

It is accordingly an object of the invention to provide a transmission configuration and a method for controlling a transmission which overcome the above-mentioned disadvantages of the heretofore-known methods and configurations of this general type. It is in particular an object of the invention to provide a transmission configuration whose sensor configuration is cost-effective and saves space and allows performing typical control functions of a dual-clutch transmission without limitations or restrictions. Another object of the invention is to provide a method for controlling a transmission which allows performing typical control functions of a dual-clutch transmission with a reduced number of speed sensor units.

With the foregoing and other objects in view there is provided, in accordance with the invention, a transmission configuration, including:

a drive shaft configured to be connected to a motor;

an automated dual-clutch transmission including a housing and two transmission sections with respective input shafts, respective output shafts and respective motor clutches, the motor clutches having a motor side and a transmission side, and the motor clutches being connected to the drive shaft on the motor side of the motor clutches and being connected to a respective one of the input shafts on the transmission side of the motor clutches;

an axle drive;

each of the transmission sections including gearwheel sets, the gearwheel sets forming a respective group of gear stages and having respective fixed gears and respective idler gears;

each of the transmission sections including gear clutches assigned to the idler gears such that, when a given one of the gear clutches assigned to a given one of the idler gears is engaged, a respective one of the input shafts is connected to a respective one of the output shafts with a given gear ratio, and the respective one of the output shafts is operatively connected to the axle drive;

a drive-side speed sensor unit disposed at the drive shaft; and an input-side speed sensor configuration including a first sensor wheel connected, fixed against relative rotation, to a first one of the input shafts, a second sensor wheel connected, fixed against relative rotation, to a second one of the input shafts, a first pulse sensor disposed stationary with respect to the housing and within an effective range of the first sensor wheel, and a second pulse sensor disposed stationary with respect to the housing and within an effective range of the second sensor wheel, the input-side speed sensor configuration being configured to detect a speed of the input shafts and a direction of rotation of at least one of the input shafts, the drive-side speed sensor unit and the input-side speed sensor configuration forming a sensor configuration for controlling the automated dual-clutch transmission.

In accordance with another feature of the invention, the first sensor wheel and the first pulse sensor form a first input-side speed sensor unit, the first input-side speed sensor unit is sensitive to speed and sensitive to a direction of rotation, the second sensor wheel and the second pulse sensor form a second input-side speed sensor unit.

In accordance with another feature of the invention there is provided, a power take-off shaft connected to the axle drive, the respective one of the output shafts is operatively connected to the axle drive by being permanently connected to the power take-off shaft.

In accordance with a further feature of the invention, the respective one of the output shafts which is operatively connected to the axle drive forms a power take-off shaft connected to the axle drive.

In accordance with yet another feature of the invention, the first sensor wheel is a rotary-direction encoded sensor wheel and the first pulse sensor is a simple pulse sensor.

In accordance with another feature of the invention, the drive-side speed sensor unit disposed at the drive shaft includes a pulse sensor; and the first pulse sensor, the second pulse sensor, and the pulse sensor of the drive-side speed sensor unit are combined in a pre-assembled module in order to be installed together.

In other words, according to the invention, there is provided a sensor configuration for controlling an automated dual-clutch transmission with two transmission sections, each having a motor clutch connected on a motor side thereof, via a drive shaft, to a drive motor, an input shaft connected to the motor clutch on a transmission side thereof, and gear wheel sets forming a group of gear stages and each including a fixed gear and an idler gear, wherein a connection with a gear ratio between the input shaft and an output shaft can be established with the gear stages by in each case engaging a gear clutch assigned to the idler gear, wherein the output shaft forms a power take-off shaft connected to an axle drive or wherein the output shaft is permanently connected to such a power take-off shaft, with at least a drive-side speed sensor unit disposed at the drive shaft, a first input-side speed sensor unit disposed at the first input shaft of the first transmission section, and a second input-side speed sensor unit disposed at the second input shaft of the second transmission section, each input-side speed sensor unit including a sensor wheel connected, fixed against relative rotation, to a respective input shaft and a pulse sensor disposed stationary with respect to a housing and within an effective range of the sensor wheel, characterized in that a speed sensor unit, which is speed sensitive and sensitive to a direction of rotation, is disposed at least at an input shaft of one of the two transmission sections.

As will be explained in more detail below, it is possible to accomplish typical control functions of the dual-clutch transmission for which so far the speed sensor unit on the power take-off side was needed, by using the input-side speed sensor unit according to the invention, which is speed sensitive and sensitive to a direction of rotation, and it is possible to accomplish the control functions with an even better temporal resolution due to the increased rotational speed of the input shaft. This allows either to eliminate the speed sensor unit on the power take-off side or to increase the operational reliability of the transmission control by performing the appropriate control functions in case of a defect of one of the two speed sensor units, which are speed sensitive and sensitive to a direction of rotation, in each case by the respective other speed sensor unit.

The new speed sensor unit, which is speed sensitive and sensitive to a direction of rotation, is preferably realized by a corresponding embodiment of one of the input-side speed sensor units that are already present in order to avoid a further, separate speed sensor unit. In other words, one of the two input-side speed sensor units is configured to be speed sensitive and sensitive to a direction of rotation.

The speed sensor unit that is sensitive to speed and to a direction of rotation, is preferably formed by a sensor wheel that is encoded with respect to a direction of rotation (rotary encoder wheel) and a simple pulse sensor, whose general concept is in principle known, because this type of construction is especially cost-effective and space saving and requires only one signal line.

In particular when saving the speed sensor unit on the power take-off side, it is possible to advantageously combine the pulse sensors of the drive side speed sensor unit and the two input-side speed sensor units and, if applicable, also an additional input-side speed sensor unit, which is sensitive to speed and sensitive to a direction of rotation, in a pre-assembled module that can be installed together.

With the objects of the invention in view there is also provided, a method for controlling a transmission, which includes the steps of providing an automated dual-clutch transmission with two transmission sections, each having a motor clutch connected on a motor side thereof, via a drive shaft, to a drive motor, an input shaft connected to the motor clutch on a transmission side thereof, and gear wheel sets forming a group of gear stages and each including a fixed gear and an idler gear, wherein a connection with a gear ratio between the input shaft and an output shaft can be established with the gear stages by in each case engaging a gear clutch assigned to the idler gear, wherein the output shaft forms a power take-off shaft connected to an axle drive or wherein the output shaft is permanently connected to such a power take-off shaft, and with a sensor configuration with at least a drive-side speed sensor unit disposed at the drive shaft, a first input-side speed sensor unit disposed at the input shaft of a first one of the transmission sections, and a second input-side speed sensor unit disposed at the input shaft of the second one of the transmission sections; and determining a speed and a direction of rotation of the power take-off shaft by using an input-side speed sensor unit which is speed sensitive and sensitive to a direction of rotation, by first, with an opened motor clutch, engaging a gear stage of a transmission section including the input-side speed sensor unit, by ascertaining, with the input-side speed sensor unit, a speed and a direction of rotation of the input shaft of a respective transmission section, and by subsequently calculating a speed and a direction of rotation of the power take-off shaft from the speed and the direction of rotation of the input shaft with a gear ratio and, if applicable, a reversal of a direction of rotation of an engaged gear stage.

This allows to reliably ascertain the speed and the direction of rotation of the power take-off shaft while avoiding a signal evaluation of the speed sensor unit on the power take-off side, wherein expediently the smallest gear stage of the respective transmission section is engaged in order to achieve a greatest possible temporal resolution of the rotational motion of the power take-off shaft. The method according to the invention, which is mainly used in a driving-off process in order to determine a vehicle movement, such as a forward movement of the vehicle, a stopping of the vehicle, a backward movement of the vehicle and a movement speed, can thus be used for saving, i.e. eliminating, the speed sensor unit on the power take-off side or, if desired, for increasing the operational reliability as a backup method in case of a defect of the speed sensor unit on the power take-off side.

In case of assigning the speed sensor unit that is speed sensitive and sensitive to a direction of rotation to the transmission section that includes the driving-off gear stage, it is expedient to engage the driving-off gear stage in a driving-off process for ascertaining the vehicle movement.

However, if the driving-off occurs with a driving-off gear stage of the other transmission section, then, in order to ascertain the vehicle movement, a gear stage is engaged as an auxiliary gear stage in the transmission section that includes the speed sensor unit that is speed sensitive and sensitive to a direction of rotation, in order to establish a connection to the power take-off shaft.

After finishing the driving-off process, the auxiliary gear stage is again disengaged if in a directly subsequent shift process a different gear stage is provided as a target gear stage. The auxiliary gear stage can however advantageously remain engaged if it is provided as a target gear stage in a directly subsequent shift process.

With the objects of the invention in view there is also provided a method for controlling a transmission, which includes the steps of providing an automated dual-clutch transmission with two transmission sections, each having a motor clutch connected on a motor side thereof, via a drive shaft, to a drive motor, an input shaft connected to the motor clutch on a transmission side thereof, and gear wheel sets forming a group of gear stages and each including a fixed gear and an idler gear, wherein a connection with a gear ratio between the input shaft and an output shaft can be established with the gear stages by in each case engaging a gear clutch assigned to the idler gear, wherein the output shaft forms a power take-off shaft connected to an axle drive or wherein the output shaft is permanently connected to such a power take-off shaft, and with a sensor configuration with at least a drive-side speed sensor unit disposed at the drive shaft, and an input-side speed sensor unit disposed at the input shaft of one of the two transmission sections; and determining a speed of the input shaft of one transmission section by using an input-side speed sensor unit of another transmission section, by first, with a respective engaged gear stage in both transmission sections, ascertaining, with the input-side speed sensor unit, a speed of the input shaft of the other transmission section and by subsequently calculating the speed of the input shaft of the one transmission section from the ascertained speed with the gear ratios of both engaged gear stages.

In a similar manner it is also possible to determine a direction of rotation of the input shaft of the one transmission section with the input-side speed sensor unit of the other transmission section, that is configured to be sensitive to a direction of rotation, by first, with a respective engaged gear stage in both transmission sections, ascertaining, with this input-side speed sensor unit, a direction of rotation of the input shaft of the other transmission section and by subsequently calculating the direction of rotation of the input shaft of the one transmission section from the direction of rotation with the changes in a direction of rotation of the gearwheel sets of both engaged gear stages. In this case, however, in contrast to the above-described determination of the speed of the input shaft of the one transmission section, it is necessary to configure the applicable input-side speed sensor unit such that it is sensitive to the direction of rotation.

With the described procedure it is possible to determine the speed and the direction of rotation of the input shaft of that transmission section whose input-side speed sensor is not used, while avoiding a signal evaluation of the speed sensor unit on the power take-off side as well as one of the two input-side speed sensor units. The method according to the invention, which is mainly used for a sequential shift process, i.e. in the present case a shift process between a load gear stage of the other transmission section and a target gear stage of the one transmission section, can thus alternatively be used as a backup method in case of a defect in one of the two input-side speed sensor units for increasing the operational reliability and for eliminating one of the two input-side speed sensor units.

Since in a sequential shift process the motor clutch of the transmission section that includes the target gear stage is closed by using a control, whereas the motor clutch of the transmission section including the load gear stage is in most cases opened without using a control, it is desirable to know the speed of the input shaft of the transmissions section that includes the target gear stage until the end of the shift process, i.e. until a complete closing of the concerning motor clutch occurs. Therefore, in case of a shift process, in which only the sensor signal of the input-side speed sensor unit of the transmission section that includes the load gear stage is used, the load gear stage remains expediently engaged until the motor clutch assigned to the target gear stage is completely closed. In other words, a mode of the invention includes, in case of a shift process between a load gear stage assigned to the other transmission section and a target gear stage assigned to the one transmission section, leaving the load gear stage engaged until a motor clutch assigned to the target gear stage is completely closed for determining a speed and/or a direction of rotation of the input shaft of the one transmission section by using the input-side speed sensor unit of the other transmission section.

The method according to the invention can however also be used, in a driving-off process with the driving-off gear stage of the one transmission section, for determining the speed of the assigned input shaft with the input-side speed sensor unit of the other transmission section, if a gear stage is engaged as an auxiliary gear stage in the other transmission section. In other words, a mode of the invention includes, in case of a driving-off process with a driving-off gear stage of the one transmission section, engaging a gear stage in the other transmission section as an auxiliary gear stage for determining a speed and/or a direction of rotation of the respective input shaft by using the input-side speed sensor unit of the other transmission section.

In this case, a gear stage, which is the next higher gear stage with respect to the driving-off gear stage of the one transmission section, is engaged as an auxiliary gear stage, because this gear stage is with a high probability the target gear stage of a shift process directly subsequent to the driving-off process.

With the objects of the invention in view there is also provided a method for controlling a transmission, which includes the steps of providing an automated dual-clutch transmission with two transmission sections, each having a motor clutch connected on a motor side thereof, via a drive shaft, to a drive motor, an input shaft connected to the motor clutch on a transmission side thereof, and gear wheel sets forming a group of gear stages and each including a fixed gear and an idler gear, wherein a connection with a gear ratio between the input shaft and an output shaft can be established with the gear stages by in each case engaging a gear clutch assigned to the idler gear, wherein the output shaft forms a power take-off shaft connected to an axle drive or wherein the output shaft is permanently connected to such a power take-off shaft, and with a sensor configuration with at least a drive-side speed sensor unit disposed at the drive shaft, a first input-side speed sensor unit disposed at the input shaft of a first one of the transmission sections, and a second input-side speed sensor unit disposed at the input shaft of the second one of the transmission sections; and determining, in case of an external synchronization of the gear stages in a shift process between a load gear stage assigned to the first one of the transmission sections and a target gear stage assigned to the second one of the transmission sections, an output-side speed of the gear clutch of the target gear stage with the first input-side speed sensor unit of the first one of the transmission sections, by first ascertaining, with the first input-side speed sensor unit, a speed of the input shaft of the first one of the transmission sections and by subsequently calculating from the ascertained speed with an effective transmission ratio between the respective input shaft and the gear clutch of the target gear stage, an output-side speed of the gear clutch of the target gear stage.

For an external synchronization of the gear stages, which is for example accomplished via auxiliary drives which are connected to the input shafts of the transmission sections, it is necessary to know the speeds on both sides of the respective gear clutch, i.e. the input-side speed and the output-side speed. The input-side speed of the gear clutch is in this case usually determined through the use of the input-side speed sensor unit of the same transmission section, wherein, in case the gear clutch is arranged on the output shaft, a conversion with the gear ratio of the concerned gear stage is performed. The output-side speed of the gear clutch can however be determined in accordance with the invention through the use of the input-side speed sensor unit of the other transmission section, while avoiding a signal evaluation of the speed sensor unit on the power take-off side, in that the determined speed of the input shaft of this sensor unit is calculated back with the effective transmission ratio between this input shaft and the gear clutch of the target gear stage, wherein this gear ratio, in case the concerned gear clutch is disposed on the output shaft, corresponds to the gear ratio of the load gear stage and, in case it is disposed on the input shaft, corresponds to the quotient of the gear ratios of the load gear stage and the target gear stage.

Other features which are considered as characteristic for the invention are set forth in the appended claims.

Although the invention is illustrated and described herein as embodied in a dual-clutch transmission configuration and a method for controlling a dual-clutch transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
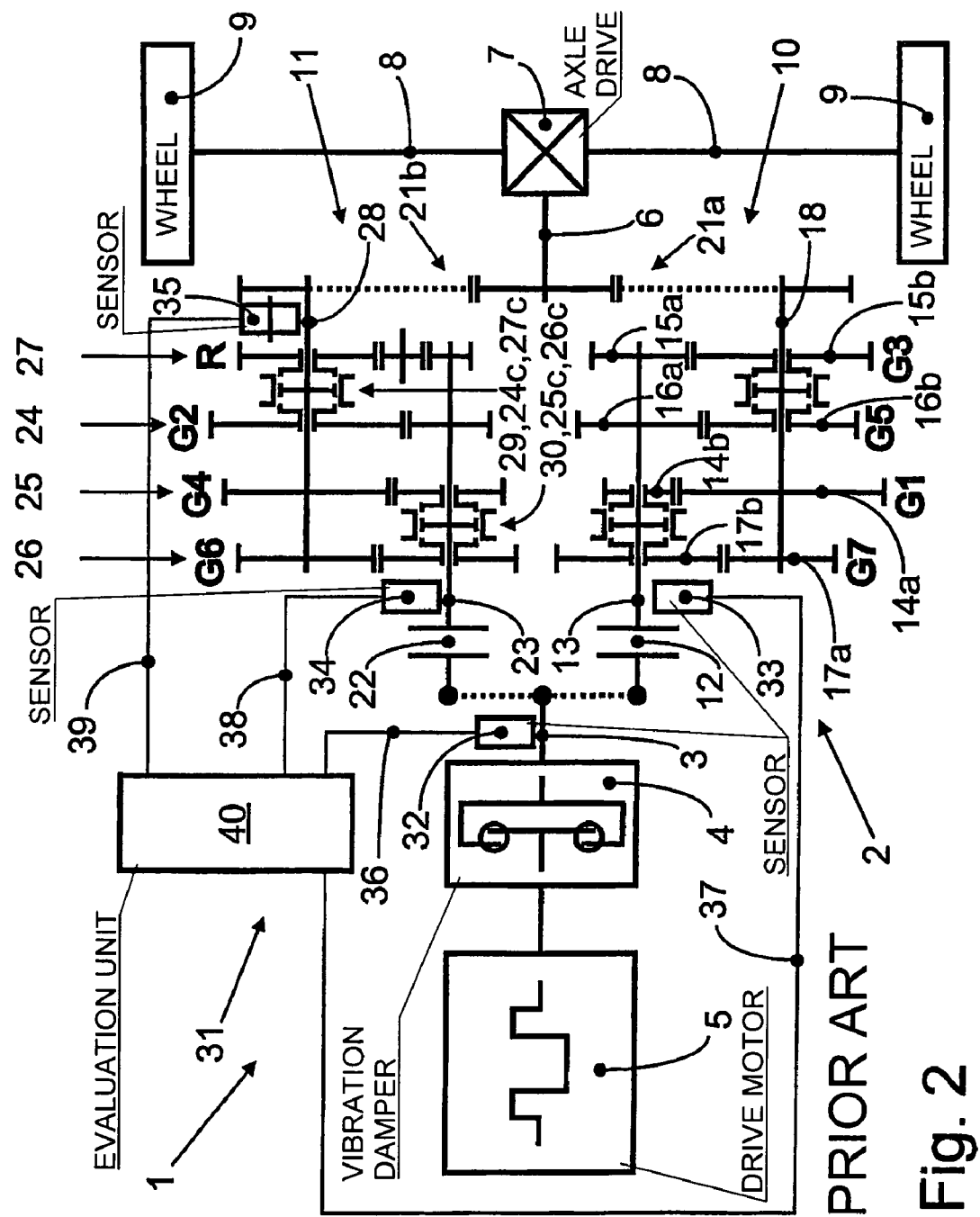
FIG. 2 is a schematic view of a drive train with a dual-clutch transmission and a sensor configuration according to the prior art.

Referring now to the figures of the drawings in detail and first, particularly, to FIG. 2 thereof, there is shown a conventional drive train 1 of a motor vehicle wherein a dual-clutch transmission 2 is connected on its input side, via a drive shaft 3 and a vibration damper 4, to a drive motor 5 which is embodied as an internal combustion engine. On its power take-off side, the dual-clutch transmission 2 is connected, via a power take-off shaft 6, to an axle drive 7, which transfers a torque, which is generated by the drive motor 5 and which is converted in the dual-clutch transmission, via drive shafts 8 to driven wheels 9.

The dual-clutch transmission 2 is formed of two transmission sections 10, 11, a first transmission section 10 and a second transmission section 11, which are disposed partly coaxial with respect to one another, however in FIG. 2 they are shown in a schematic exploded view in order to provide a better overview.

The first transmission section 10 includes a first motor clutch 12, which is connected, on its motor side, to the drive shaft 3 and is connected, on its transmission side, to a first input shaft 13. The first input shaft 13 is selectively connectable to a first output shaft 18 via one of the several gearwheel sets 14, 15, 16, 17, each of which constitutes a respective gear stage. The gearwheel sets 14, 15, 16, 17 respectively include a fixed gear 14a, 15a, 16a, 17a, which is respectively connected, in a manner fixed against relative rotation, to the first input shaft 13 or to the first output shaft 18, and an idler gear 14b, 15b, 16b, 17b, which is rotatably mounted on the first output shaft 18 or the first input shaft 13. The gearwheel sets 14, 15, 16, 17 of the first transmission section respectively form a gear stage, in this case a first forward gear stage G1, a third forward gear stage G3, a fifth forward gear stage G5 and a seventh forward gear stage G7. The gear stages G1, G3, G5, G7 can be selectively engaged and disengaged via two shift collars 19, 20, each of which being assigned to respective two gear stages, and gear clutches 14c, 15c, 16c, 17c, which are assigned to respective idler gears 14b, 15b, 16b, 17b. The first output shaft 18 is permanently in connection with a power take-off shaft 6 via a power take-off gearing 21a.

The second transmission section 11 includes a second motor clutch 22, which is connected, on its motor side, to the drive shaft 3 and is connected, on its transmission side, to a second input shaft 23. The second input shaft 23 is selectively connectable to a second output shaft 28 via one of the several gearwheel sets 24, 25, 26, 27, each of which constitutes a respective gear stage. The gearwheel sets 24, 25, 26, 27 respectively include a fixed gear 24a, 25a, 26a, 27a, which is respectively connected, in a manner fixed against relative rotation, to the second input shaft 23 or to the second output shaft 28, and an idler gear 24b, 25b, 26b, 27b, which is rotatably mounted on the second output shaft 28 or the second input shaft 23. The gearwheel sets 24, 25, 26, 27 of the second transmission section form in this case a second forward gear stage G2, a fourth forward gear stage G4, a sixth forward gear stage G6 and a reverse gear stage R, which achieves a reversal of the direction of rotation of the second output shaft 28 with respect to the forward gear stages G2, G4, G6 by using an intermediate gear 27d which is provided between the fixed gear 27a and the idler gear 27b. The power and smash 27b. The gear stages G2, G4, G6, R can be selectively engaged and disengaged via two shift collars 29, 30, each of which being assigned to respective two gear stages, and gear clutches 24c, 25c, 26c, 27c, which are assigned to respective idler gears 24b, 25b, 26b, 27b. The second output shaft 28 is also permanently in connection with a power take-off shaft 6 via a power take-off gearing 21b.

The power transmission from the drive motor 5 to the axle drive 7 is accomplished alternately via the first transmission section 10 and the second transmission section 11. A sequential shift process between a load gear stage, for example the third forward gear stage G3, of one transmission section 10 and a target gear stage, for example the fourth forward gear stage G4, of the other transmission section 11 is accomplished, with gear stages G3, G4 being engaged at the same time, in a time-overlapping control of the two motor clutches 12, 22, during which the motor clutch 12 of the load gear stage G3 is opened and the motor clutch 22 of the target gear stage G4 is closed without an interruption of the tractive force.

For the control of the two motor clutches 12, 22, in particular during driving-off processes and shift processes, the dual-clutch transmission 2 normally includes a sensor configuration 31 with a speed sensor unit 32 on the drive side, that is disposed at the drive shaft 3, a first speed sensor unit 33 on the input side, that is disposed at the first input shaft 13, and a second speed sensor unit 34 on the input side, that is disposed at a second input shaft 23. The conventional sensor configuration 31 includes in this case also a speed sensor unit 35 on the power take-off side, that is disposed at the second output shaft 28 in particular for detecting a vehicle movement during driving-off processes, such as when the vehicle moves forward, stops, moves backwards, and for detecting a movement speed, and for a plausibility check of the respective active gear stage. The speed sensor units 32, 33, 34, 35, of which the speed sensor unit 35 on the power take-off side is configured to be sensitive to speed and sensitive to the direction of rotation, which is symbolized in the illustration of the speed sensor unit 35 in FIG. 2 by a dividing line, and the remaining speed sensor units 32, 33, 34 are configured to be only speed sensitive, are connected, via sensor lines 36, 37, 38, 39, to an evaluation unit 40, which is connected to a transmission control device (not shown) or which is a component of the transmission control device. Actuators (not shown) for actuating the motor clutches 12, 22 and the shift collars 19, 20, 29, 30 are controlled by the transmission control device.

Figure 1:
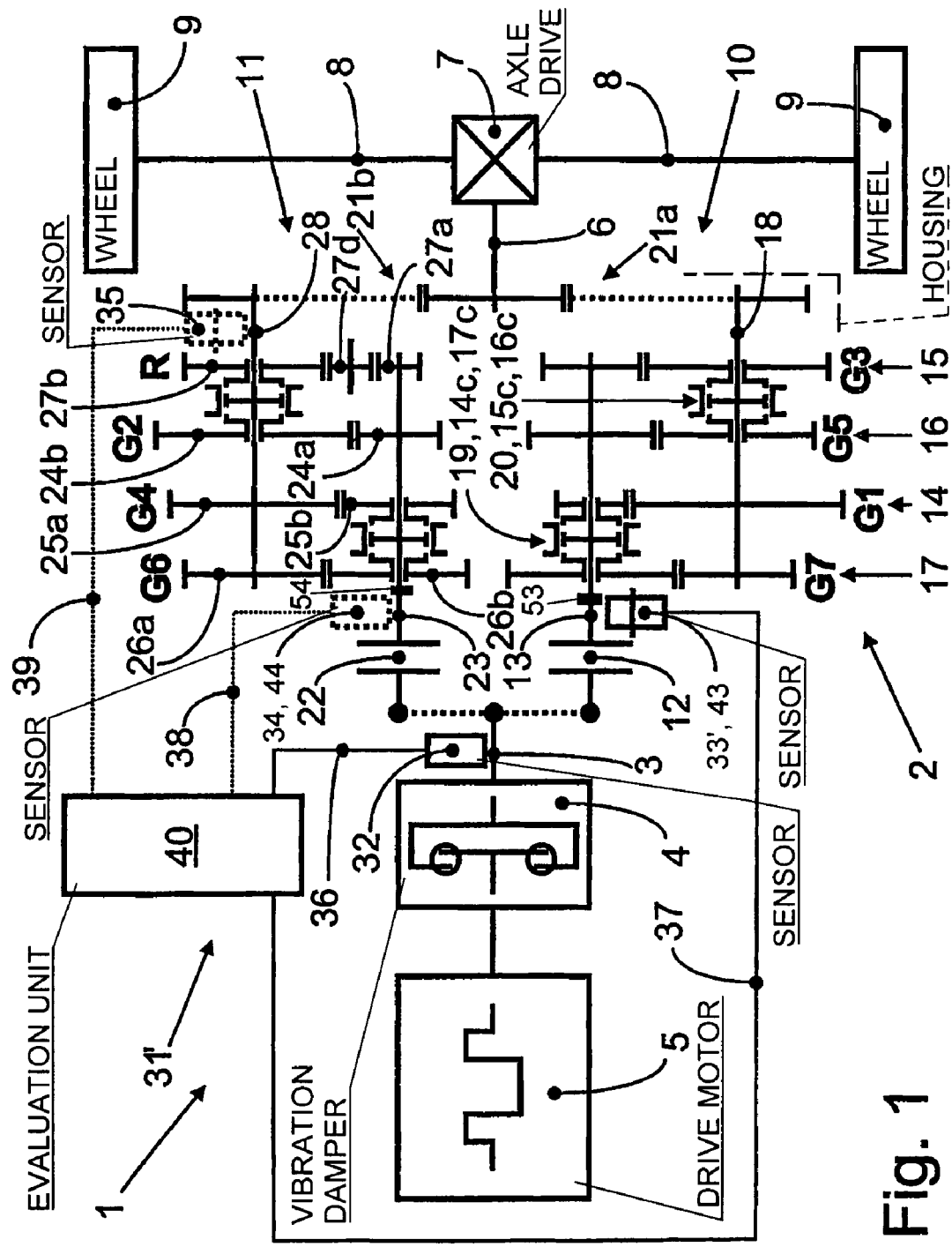
FIG. 1 is a schematic view of a drive train with a dual-clutch transmission and a sensor configuration according to the invention.

In the drive train 1 shown in FIG. 1, in an otherwise identical configuration, one of the two speed sensor units 33, 34 on the input side, is configured to be sensitive to (rotational) speed and to the direction of rotation in accordance with the invention, in the present case the first speed sensor unit 33' on the input side is configured to be sensitive to the speed and to the direction of rotation which is symbolized in the illustration of the speed sensor unit 33' in FIG. 1 by a dividing line. The speed sensor units 33', 34 preferably include sensor wheels (encoder wheels) 53, 54 and pulse sensors 43, 44. As is explained in an exemplary manner in the following, this provides the possibility, to perform typical control functions of the dual-clutch transmission 2 without an evaluation of the sensor signals of the speed sensor unit 35 on the power take-off side and, if applicable, even without an evaluation of the sensor signals of the second speed sensor unit 34 on the input side which is only sensitive to speed. This can optionally be used for saving, i.e. eliminating, the respective speed sensor units 34, 35 or for maintaining the ability to operate the dual-clutch transmission 2 in case of a defect of these speed sensor units 34, 35 and consequently for increasing operational reliability of the dual-clutch transmission 2. A possible elimination or a defect of the respective speed sensor units 34, 35 is indicated in FIG. 1 by representing the speed sensor units 34, 35 and the associated sensor lines 38, 39 in dashed lines.

In accordance with the invention, the speed and the direction of rotation of the power take-off shaft 6 can be determined through the use of the first speed sensor unit 33' on the input side, in that, with the first motor clutch 12 opened, at first, a gear stage G1, G3, G5, G7 of the first transmission section 10 is engaged, in that the speed and the direction of rotation of the first input shaft 13 is determined through the use of the speed sensor unit 33', and in that subsequently the speed and the direction of rotation of the power take-off shaft 6 is calculated from the speed and the direction of rotation of the input shaft 13 with the gear ratio and (if applicable) a reversal of the direction of rotation of the engaged gear stage G1, G3, G5, G7 by assigning a reverse gear stage to the first transmission section 10, which is theoretically possible but not present in this case. In this case, in order to achieve a greatest possible temporal resolution of a rotational motion of the power take-off shaft 6, whose fast and exact detection is important for determining a vehicle movement in particular in case of a driving-off process, the smallest (lowest) gear stage G1 is expediently engaged, in other words in the present case the first gear stage G1 is engaged.

Engaging the first gear stage G1 for determining the speed and the direction of rotation of the power take-off shaft 6 with the first speed sensor unit 33' on the input side is optimal with respect to the temporal resolution, no matter whether one drives off with the first gear stage G1 of the first transmission section 10 or the second gear stage G2 of the second transmission section 11. In the last mentioned case it may however also be expedient to engage the third gear stage G3 for determining the speed and the direction of rotation of the power take-off shaft 6, because this gear stage G3 has a high probability of being the target gear stage in the directly following shift process and thus it can initially remain engaged after the driving-off process.

Furthermore, the speed of the second input shaft 23 can also be determined with the sensor configuration 31' according to the invention through the use of the first speed sensor unit 33' on the input side, namely by first determining the speed of the first input shaft 13 by means of the speed sensor unit 33' in case of a respective engaged gear stage (G3, G4) in both transmissions sections 10, 11, and by subsequently calculating the speed of the second input shaft 23 from this speed with the gear ratios of the two engaged gear stages (G3, G4). This method can be used for a shift process between a load gear stage of one transmission section and a target gear stage of the other transmission section and can also be used for a driving-off process with a driving-off gear stage of the second transmission section 11. In case of shifting into a target gear stage (G4) of the second transmission section 11 it is expedient for an exact determination of the speed of the second input shaft 23 to leave the load gear stage (G3) of the first transmission section 10 in its engaged state until the second motor clutch 22 is completely closed. In a driving-off process with a driving-off gear stage, e.g. the second gear stage G2, of the second transmission section 11, a gear stage of the first transmission section 10 is engaged as an auxiliary gear stage for determining the speed of the second input shaft 23 by means of the first speed sensor unit 33' on the input side, wherein expediently the gear stage which is the next higher one to the driving-off gear stage G2 of the second transmission section 11 is engaged, i.e. in the present case the third gear stage G3 of the first transmission section 10.

Finally, in case of an external synchronization of the gear stages in a shift process between a load gear stage G1, G3, G5, G7, which is assigned to the first transmission section 10, and a target gear stage G2, G4, G6, R, which is assigned to the second transmission section 11, the method according to the invention can also be used to determine the speed of the gear clutch 24c, 25c, 26c, 27c on the output-side by means of the first speed sensor unit 33' on the input side. This is done by first determining the speed of the first input shaft 13 with the speed sensor unit 33', and by subsequently calculating from this speed the speed on the output-side of the gear clutches 24c, 25c, 26c, 27c of the target gear stage G2, G4, G6, R with the effective gear ratio between the respective input shaft 13 and the gear clutch 24c, 25c, 26c, 27c of the target gear stage G2, G4, G6, R.

LIST OF REFERENCE NUMERALS 1 drive train
2 dual-clutch transmission
3 drive shaft
4 vibration damper
5 drive motor
6 power take-off shaft
7 axle drive
8 drive shaft
9 wheel
10 (first) transmission section
11 (second) transmission section
12 (first) motor clutch
13 (first) input shaft
14, 15, 16, 17 gearwheel set
14a, 15a, 16a, 17a fixed gear
14b, 15b, 16b, 17b idler gear
14c, 15c, 16c, 17c gear clutch
18 (first) output shaft
19, 20 shift collar
21a, 21b power take-off gearing
22 (second) motor clutch
23 (second) input shaft
24, 25, 26, 27 gearwheel set
24a, 25a, 26a, 27a fixed gear
24b, 25b, 26b, 27b idler gear
24c, 25c, 26c, 27c gear clutch
27d intermediate gear
28 (second) output shaft
29, 30 shift collar
31, 31' sensor configuration
32 drive-side speed sensor unit
33, 33' (first) input-side speed sensor unit
34 (second) input-side speed sensor unit
35 speed sensor unit on the power take-off side
36, 37, 38, 39 sensor line
40 evaluation unit
43, 44 pulse sensor
53, 54 sensor wheel
G1-G7 (forward) gear stage
R (reverse) gear stage

What is claimed is:

1. A method for controlling a transmission, the method which comprises:

providing an automated dual-clutch transmission with two transmission sections, each having a motor clutch connected on a motor side thereof, via a drive shaft, to a drive motor, an input shaft connected to the motor clutch on a transmission side thereof, and gear wheel sets forming a group of gear stages and each including a fixed gear and an idler gear, wherein a connection with a gear ratio between the input shaft and an output shaft can be established with the gear stages by in each case engaging a gear clutch assigned to the idler gear, wherein the output shaft forms a power take-off shaft connected to an axle drive or wherein the output shaft is permanently connected to such a power take-off shaft, and with a sensor configuration with at least a drive-side speed sensor unit disposed at the drive shaft, a first input-side speed sensor unit disposed at the input shaft of a first one of the transmission sections, and a second input-side speed sensor unit disposed at the input shaft of the second one of the transmission sections; and determining a speed and a direction of rotation of the power take-off shaft by using an input-side speed sensor unit which is speed sensitive and sensitive to a direction of rotation, by first, with an opened motor clutch, engaging a gear stage of a transmission section including the input-side speed sensor unit, by ascertaining, with the input-side speed sensor unit, a speed and a direction of rotation of the input shaft of a respective transmission section, and by subsequently calculating a speed and a direction of rotation of the power take-off shaft from the speed and the direction of rotation of the input shaft with a gear ratio and, if applicable, a reversal of a direction of rotation of an engaged gear stage.

2. The method according to claim 1, which comprises engaging a smallest one of the gear stages of the respective transmission section in order to achieve a maximum temporal resolution of a rotational motion of the power take-off shaft.

3. The method according to claim 1, which comprises using an ascertainment of the speed and the direction of rotation of the power take-off shaft in a driving-off process in order to determine a vehicle movement.

4. The method according to claim 3, which comprises determining a vehicle movement selected from the group consisting of a forward movement of a vehicle, a stopping of a vehicle, a backwards movement of a vehicle, and a movement speed of a vehicle.

5. The method according to claim 3, which comprises engaging a driving-off gear stage for determining the vehicle movement, in case the input-side speed sensor unit, which is speed sensitive and sensitive to a direction of rotation, is assigned to a transmission section including the driving-off gear stage.

6. The method according to claim 3, which comprises, in case the input-side speed sensor unit, which is speed sensitive and sensitive to a direction of rotation is assigned to a transmission section which does not include a driving-off gear stage, engaging a gear stage as an auxiliary gear stage in the transmission section which does not include the driving-off gear stage in order to determine the vehicle movement.

7. The method according to claim 6, which comprises selectively disengaging the gear stage used as the auxiliary gear stage after finishing the driving-off process if, in a directly subsequent shift process, another gear stage is provided as a target gear stage and leaving the gear stage used as the auxiliary gear stage engaged if, in a directly subsequent shift process, the gear stage is provided as a target gear stage.

* * * * *